United States Patent

[11] 3,589,273

[72] Inventor Harvey R. Karlen
  Chicago, Ill.
[21] Appl. No. 832,239
[22] Filed June 11, 1969
[45] Patented June 29, 1971
[73] Assignee Cory Corporation

[54] HOT WATER SUPPLY APPARATUS
  17 Claims, 4 Drawing Figs.

[52] U.S. Cl. ................................................. 99/307
[51] Int. Cl. .......................................... A47j 31/057
[50] Field of Search........................................... 99/300,
  281, 289, 288, 307

[56] References Cited
  UNITED STATES PATENTS
  3,336,856 8/1967 Martin........................ 99/288
  3,412,672 11/1968 Herbsthofer ................ 99/300

3,473,463 10/1969 McKnight..................... 99/307

Primary Examiner—Donald A. Griffin
Attorney—Hofgren, Wegner, Allen, Stellman and McCord ABSTRACT: A hot water supply apparatus such as for use in a coffee brewer wherein cold water is poured into the top of the apparatus to displace hot water from a heating tank therein and cause delivery of the displaced hot water to a brewing cartridge wherein the coffee is brewed and then delivered to a suitable receptacle, such as a decanter. The means for conducting the poured cold water into the heating tank includes a basin within an outer housing of the apparatus. The basin is provided with a lid which further closes the open top of the housing. The lid is provided with a duct member having a selectively positionable cover permitting the user to pour cold water into the basin without removing the lid. However, when servicing of the apparatus through the open top of the housing is desired, the entire lid may be readily removed.

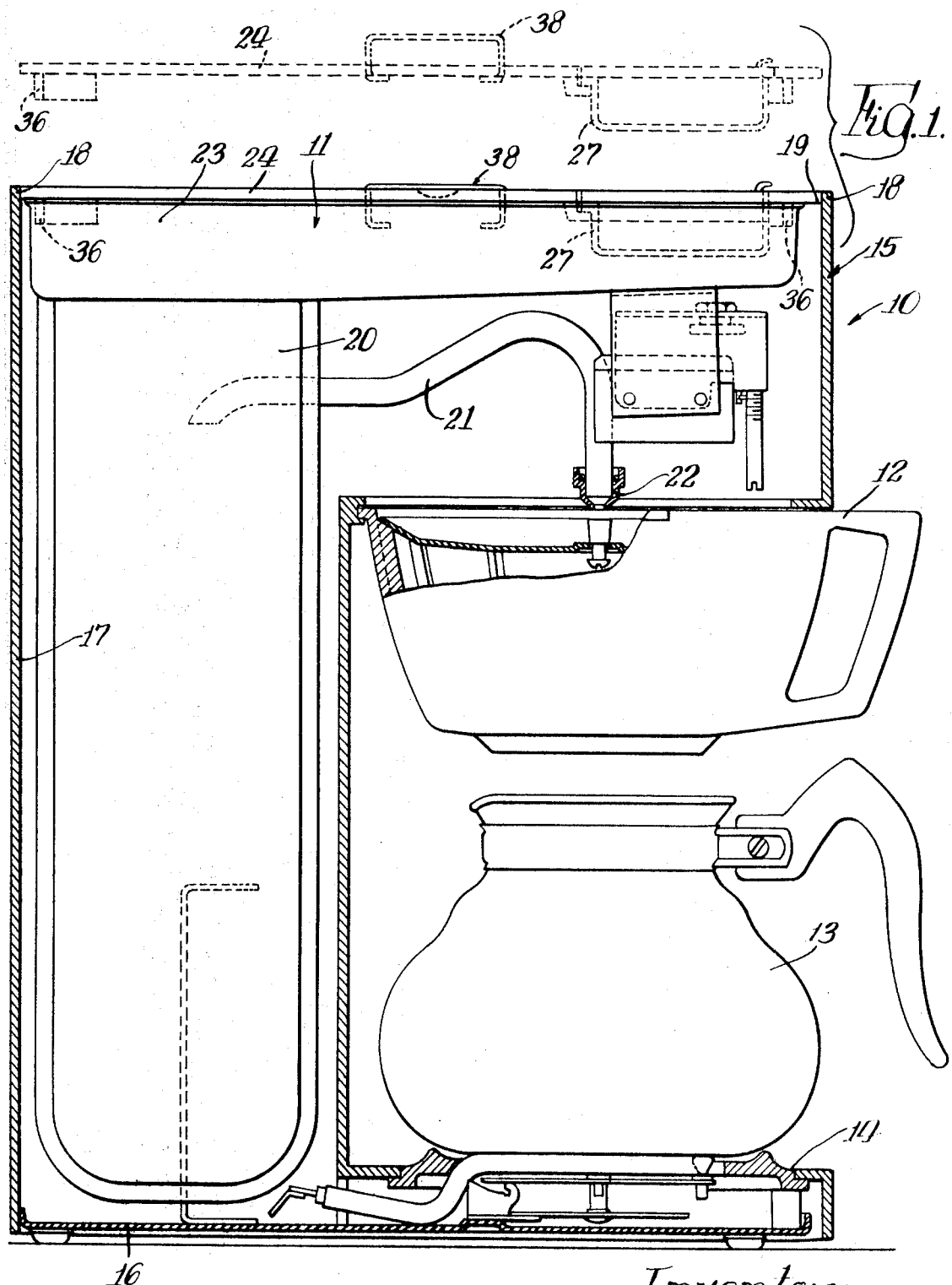

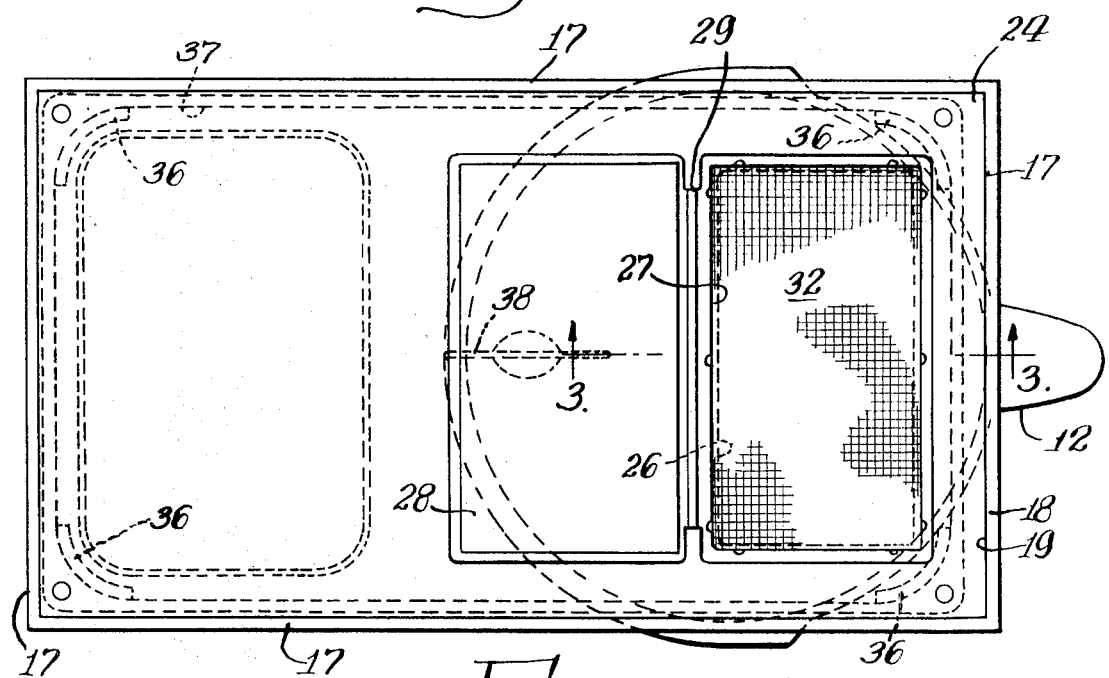

HOT WATER SUPPLY APPARATUS

BACKGROUND OF THE INVENTION

1. Field of the Invention

This invention relates to hot water supply apparatus and in particular to hot water supply apparatus of the pour-through-type wherein cold water is poured into a hot water tank to displace previously heated water outwardly through an outlet from the tank.

2. Description of the Prior Art

In pour-through brewers, it has been conventional to provide a cabinet housing the apparatus with an opening in the top wall of the cabinet to permit pouring of cold water through the opening into the receptacle portion of the hot water supply apparatus. The provision of such a top wall having a relatively small opening for permitting the pouring of water therethrough while precluding ready access to the apparatus through the top portion of the housing has presented servicing problems. Illustratively, it is desirable to periodically clean the receptacle receiving the cold water. Thus, it is desirable to provide ready free access to the receptacle. Further, it is desirable to provide ready access to other components of the apparatus and where the access is provided only by disassembling substantial portions of the housing, such access is difficult and time consuming.

SUMMARY OF THE INVENTION

The present invention comprehends an improved hot water supply apparatus avoiding the disadvantages of the above discussed hot water supply apparatuses of the art in a novel and simple manner.

More specifically, the invention comprehends the provision of a hot water supply apparatus wherein the basin, or receptacle, associated with the heating tank for receiving the poured cold water is provided with a removable lid which further serves to close the open top of the housing of the apparatus. By eliminating the top wall of the housing, or cabinet, complete free access to the apparatus within the housing is provided by simple removal of the receptacle lid.

The lid may be provided with a tubular duct member through which the cold water may be poured without the necessity of removing the lid to provide full access to the receptacle. The duct may be provided with a movable cover which selectively closes the duct. The cover may be integrally formed with the duct as by the plastic molding thereof. The duct further may be provided with means for screening the water poured therethrough so as to prevent delivery of foreign objects, etc., to the water in the receptacle.

The lid may rest on the receptacle while having a preselected fit with the upper edge of the sidewalls of the housing so as to permit the lid to further define a closure extending across the upper open end of the housing.

The duct may extend downwardly from the lid to substantially within the receptacle for improved splash-free delivery of the poured water to the receptacle. Each of the lid and cover may be provided with a handle for facilitated manipulation thereof.

BRIEF DESCRIPTION OF THE DRAWING

Other features and advantages of the invention will be apparent from the following description taken in connection with the accompanying drawing wherein:

FIG. 1 is a fragmentary vertical section of a coffee brewer provided with a hot water supply apparatus embodying the invention, the lid structure being open in removed relationship to the apparatus in dotted lines;

FIG. 2 is a top plan view of the apparatus;

FIG. 3 is a fragmentary enlarged vertical section taken substantially along the line 3-3 of FIG. 2; and FIG. 4 is a view similar to FIG. 3 but with the cover in the closed position.

DESCRIPTION OF THE PREFERRED EMBODIMENT

In the exemplary embodiment of the invention as shown in the drawing, a coffee brewer generally designated 10 is shown to include a hot water supply apparatus generally designated 11 and a brewing cartridge 12. The brewing apparatus 10 is arranged to deliver hot water to the cartridge 12 as a result of the delivery of cold water to the hot water supply apparatus 11. The hot water effects a brewing of the beverage, such as coffee, in the cartridge 12 which is delivered to a suitable receptacle, such as a conventional decanter 13 carried on a subjacent heater support 14.

Apparatus 10 includes a housing, or cabinet, 15 having a bottom wall 16 and sidewall 17 terminating in an upper edge 18 defining an open top 19 of the cabinet. The hot water supply apparatus 11 includes a heating tank 20 in which water is heated and from which delivered to an outlet 21 to a spray head 22 overlying the cartridge 12. The hot water is displaced from tank 20 by cold water being delivered thereto as from a receiver 23 comprising a basin, or receptacle, extending subjacent the open top 19 of the cabinet 15. As shown in FIG. 1, the basin 23 extends substantially fully across the open top 19. Cold water is poured into the basin for flow therefrom downwardly into the tank 20 to thereby displace a corresponding quantity of hot water from the tank to the cartridge as discussed above.

A lid 24 is carried on the basin 23 to extend fully across the top thereof. The lid 24 may have a preselected fit with the upper edge 18 of the sidewalls 17 so that the lid further serves as a means for closing the open upper end of the cabinet 15. As best seen in FIG. 4, the lid 24 rests on an out-turned flange 25 of the basin 23 to extend flush with the upper edge 18 of the sidewalls. An opening 26 is provided in the lid 24 to permit the pouring of cold water downwardly thereinto from the basin 23 when desired.

Opening 26 is provided with a duct means comprising a tubular duct portion 27 and an integral cover 28 which is movably associated with the duct portion as by hinge 29 for selective disposition in a duct open position as shown in FIG. 3, and a duct closed position as shown in FIG. 4. The cover 28 may be provided with an integral handle 30 for facilitated manipulation of the cover between the duct-open and the duct-closed positions.

The duct 27 may be further provided with an inturned flange 31 at its lower end for supporting a screen element 32 for screening foreign matter from the cold water poured through the duct into the basin 23. The screen 32 may be formed integrally with the duct or provided as a separate element as desired. Where the screen is formed as a separate element, it may be removably supported on the inturned flange 31 for facilitated removal or installation as in servicing the screen. In the illustrated embodiment, the duct 27, cover 28, hinge 29, and handle 30 are formed as a one-piece member as by suitable molding thereof from plastic.

The duct 27 may be provided with a pair of spaced flanges 33 and 34 for receiving an inturned flange 35 on the lid 24 for removably supporting the duct on the lid.

Lid 24 may be provided with a depending guide 36 which engages the sidewall 37 of the basin 23 to center the lid on the basin.

The lid 24 may be provided with a handle 38 for facilitated manipulation thereof as in removal and installation thereof on the basin. The handle may comprise a turned wire handle having leg portions 39 axially removably received in a pair of openings 40 in the lid for selective disposition of the handle in a retracted disposition as shown in FIGS. 1 and 3 and in an extended disposition wherein the bight portion 41 is spaced above the lid 24 for facilitated fingertip grasping. Thus, in use, the user merely swings the cover 28 from the closed position of FIG. 4 to the open position of FIG. 3 permitting the pouring of cold water through duct 27 and screen 32 and the subjacent basin 23 for flow therefrom into heating tank 20. The cold water displaces a corresponding amount of hot water from the tank through the outlet 21 to brew a corresponding quantity of beverage in the cartridge 12. The beverage is automatically delivered to the subjacent decanter 13.

Lid 24 effectively closes the open upper end of the cabinet 15 while yet permitting ready free access to the apparatus by the simple removal of the lid by an upward displacement thereof as shown in dotted lines in FIG. 1. This displacement is readily effected by means of the handle 38. Upon completion of the servicing, the lid 24 is simply replaced on the basin to restore the apparatus to the normal assembled arrangement.

As shown in FIG. 1, the duct 27 extends downwardly into the receptacle 23 to direct the incoming cold water into the receptacle relatively free of splashing and the like.

The cover 28 is effectively flush with the lid 24, as shown in FIG. 4, and as the lid 24 is effectively flush with the top edge 18 of the cabinet sidewalls, the apparatus defines an effectively flush top wall having only the small projection of the retractable handle 38 and the handle 30 extending above the plane of the top surface of the lid 24.

The guide 36 may further serve to provide a frictional retention of the lid on the basin by its fit on the basin as shown in FIGS. 1 and 2. The duct 27 may be readily installed in the opening 26 by providing inclined surfaces 42 on the flanges 34 as best seen in FIG. 3. The duct 27 may be formed of a suitable deformable plastic to permit a constriction thereof suitably to disengage the shoulder of the flange 34 from the flange 35 and permit removal of the duct upwardly through opening 26 when desired.

Thus, the brewing apparatus 10 is extremely simple and economical of construction while yet providing an improved hot water supply apparatus affording facilitated access to the apparatus through the upper open end of the cabinet. Under normal operation, water may be poured into the basin through the smaller passage of duct 27 which may be selectively closed by facilitated selective movement of the associated cover 28. Lid 24 is similarly simple and economical of construction while yet providing improved facilitated access to the basin and other apparatus of the brewer when desired.

The foregoing disclosure of specific embodiments is illustrative of the broad inventive concepts comprehended by the invention.

I claim:

1. Hot water supply apparatus comprising:
    a housing having an open top;
    heating tank means in said housing having an outlet;
    delivery means in said housing having a receiver subjacent said open top for receiving cold water and means for delivering said cold water to the heating tank to displace heated water therefrom through said outlet;
    a lid carried by and removably covering said receiver and further effectively closing said open top of the housing; and
    duct means on said lid for selectively providing a flow passage therethrough for conducting cold water poured therethrough to said receiver.

2. The hot water supply apparatus of claim 1 wherein said duct means includes means for receiving the cold water poured therethrough.

3. The hot water supply apparatus of claim 1 further including a removable cover selectively closing said duct means.

4. The hot water supply apparatus of claim 1 wherein said duct means includes a cover movably carried by said duct means for selectively closing said duct means.

5. The hot water supply apparatus of claim 4 including means hingedly connecting said cover to said duct means.

6. The hot water supply apparatus of claim 4 further including a manipulating handle on said cover for facilitated selective disposition of said cover.

7. The hot water supply apparatus of claim 1 further including a manipulating handle on said lid for facilitated removal and installation thereof relative to said open top of the housing.

8. The hot water supply apparatus of claim 1 wherein said duct means comprises a tubular wall and means on said wall for engaging said lid to support said wall in depending relationship to said lid.

9. The hot water supply apparatus of claim 1 wherein said duct means comprises a one-piece member defining a duct portion and a cover portion including integral means hingedly connecting the cover portion to the duct portion.

10. The hot water supply apparatus of claim 9 wherein said member comprises a plastic molding.

11. The hot water supply apparatus of claim 9 wherein said member further includes an integral handle on said cover portion.

12. The hot water supply apparatus of claim 1 wherein said apparatus further includes means carried by said housing for brewing a beverage from said hot water delivered from said heating tank means.

13. The hot water supply apparatus of claim 1 wherein said housing includes sidewalls having top edges defining said open top and said lid is disposed within said open top flush with said top edges.

14. The hot water supply apparatus of claim 1 wherein said lid is removably supported on said delivery means.

15. The hot water supply apparatus of claim 1 wherein said lid is removably supported on said receiver and has a preselected fit with said housing within said open top.

16. The hot water supply apparatus of claim 1 wherein said duct means extends downwardly into said receiver.

17. The hot water supply apparatus of claim 1 further including means on said lid engaging said receiver for centering said lid in a preselected overlying relationship to said receiver.